US012692392B2

(12) United States Patent
Oki et al.

(10) Patent No.: US 12,692,392 B2
(45) Date of Patent: Jul. 28, 2026

(54) POLYETHER-POLYSILOXANE CROSSLINKED RUBBER SPHERICAL PARTICLE, METHOD FOR MANUFACTURING THE SAME, POLYETHER-POLYSILOXANE CROSSLINKED COMPOSITE PARTICLE, AND METHOD FOR MANUFACTURING THE SAME

(71) Applicant: SHIN-ETSU CHEMICAL CO., LTD., Tokyo (JP)

(72) Inventors: Takahito Oki, Takasaki (JP); Yoshinori Inokuchi, Takasaki (JP); Shunji Aoki, Annaka (JP); Tsuneo Kimura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 946 days.

(21) Appl. No.: 17/918,668

(22) PCT Filed: Mar. 9, 2021

(86) PCT No.: PCT/JP2021/009108

§ 371 (c)(1),
(2) Date: Oct. 13, 2022

(87) PCT Pub. No.: WO2021/220625

PCT Pub. Date: Nov. 4, 2021

(65) Prior Publication Data

US 2023/0348720 A1 Nov. 2, 2023

(30) Foreign Application Priority Data

Apr. 28, 2020 (JP) ................................ 2020-078800

(51) Int. Cl.
*C08L 83/04* (2006.01)
*C08L 83/12* (2006.01)

(52) U.S. Cl.
CPC ............... *C08L 83/04* (2013.01); *C08L 83/12* (2013.01); *C08L 2205/025* (2013.01)

(58) Field of Classification Search
CPC ..... C08L 83/04; C08L 83/12; C08L 2205/025
USPC .......................................................... 523/206
See application file for complete search history.

(56) References Cited

U.S. PATENT DOCUMENTS

| | | | |
|---|---|---|---|
| 3,159,601 | A | 12/1964 | Ashby |
| 3,159,662 | A | 12/1964 | Ashby |
| 3,220,972 | A | 11/1965 | Lamoreaux |
| 3,775,452 | A | 11/1973 | Karstedt et al. |
| 4,892,726 | A | 1/1990 | Yonekura et al. |
| 5,082,596 | A | 1/1992 | Fukuda et al. |
| 5,628,989 | A | 5/1997 | Harashima et al. |
| 6,476,123 | B1 | 11/2002 | Morita et al. |
| 6,531,542 | B1 | 3/2003 | Morita et al. |
| 2006/0009555 | A1 | 1/2006 | Haubennestel et al. |

(Continued)

FOREIGN PATENT DOCUMENTS

| | | | |
|---|---|---|---|
| CN | 1718613 | A | 1/2006 |
| CN | 104546512 | A | 4/2015 |

(Continued)

OTHER PUBLICATIONS

Jan. 2, 2024 Search Report issued in Chinese Patent Application No. 202180030912.1.

(Continued)

*Primary Examiner* — Robert S Jones, Jr.
*Assistant Examiner* — Elizabeth Amato
(74) *Attorney, Agent, or Firm* — Oliff PLC

(57) ABSTRACT

A polyether-polysiloxane crosslinked rubber spherical particle including an addition-reaction product of a composition containing: (A) a polyether having at least two aliphatic unsaturated groups per molecule; (B) an organohydrogenpolysiloxane shown by the following formula (1), where $0<l\leq1000$, $2\leq m\leq1000$, $0\leq n\leq1000$, $R^1$ represents a hydrogen atom, a monovalent hydrocarbon group having 1 to 12 carbon atoms that is unsubstituted or is substituted with a halogen atom, or an alkoxy group, and $R^2$ represents a monovalent hydrocarbon group having 1 to 20 carbon atoms, the organohydrogenpolysiloxane having at least two silicon-bonded hydrogen atoms per molecule; and (C) a hydrosilylation-reaction catalyst. This can provide rubber spherical particles and composite particles that exhibit excellent dispersibility in an aqueous composition and exhibit degradation characteristics in response to external stimuli; and methods for manufacturing the particles.

(1)

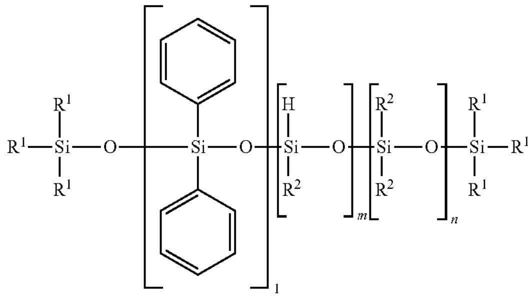

4 Claims, 1 Drawing Sheet

(56) References Cited

U.S. PATENT DOCUMENTS

| | | | | |
|---|---|---|---|---|
| 2008/0207825 | A1* | 8/2008 | Stark | C08G 77/38 526/279 |
| 2015/0118320 | A1 | 4/2015 | Inokuchi et al. | |
| 2019/0077920 | A1 | 3/2019 | Kamei | |
| 2019/0233646 | A1 | 8/2019 | Inagaki et al. | |
| 2020/0048427 | A1 | 2/2020 | Phan et al. | |
| 2021/0292560 | A1 | 9/2021 | Takada et al. | |

FOREIGN PATENT DOCUMENTS

| | | | | | |
|---|---|---|---|---|---|
| CN | 107922740 | A | | 4/2018 | |
| CN | 109651614 | A | | 4/2019 | |
| CN | 110072943 | A | | 7/2019 | |
| EP | 3 498 777 | A1 | | 6/2019 | |
| JP | S58-219218 | A | | 12/1983 | |
| JP | S63-012489 | B2 | | 3/1988 | |
| JP | S63-297313 | A | | 12/1988 | |
| JP | H02-102263 | A | | 4/1990 | |
| JP | H04-017162 | B2 | | 3/1992 | |
| JP | H04-066446 | B2 | | 10/1992 | |
| JP | H06-055805 | B2 | | 7/1994 | |
| JP | H08-012524 | A | | 1/1996 | |
| JP | H08-012545 | A | | 1/1996 | |
| JP | H08-012546 | A | | 1/1996 | |
| JP | H08-085753 | A | | 4/1996 | |
| JP | H09-020631 | A | | 1/1997 | |
| JP | 2000-086438 | A | | 3/2000 | |
| JP | 2001-040097 | A | | 2/2001 | |
| JP | 2001-048729 | A | | 2/2001 | |
| JP | 2001040214 | A | * | 2/2001 | C08J 3/26 |
| JP | 2002020558 | A | * | 1/2002 | |
| JP | 2015-067654 | A | | 4/2015 | |
| JP | 2021-055027 | A | | 4/2021 | |

OTHER PUBLICATIONS

Apr. 5, 2024 extended Search Report issued in European Patent Application No. 21796962.5.

Jan. 24, 2025 Search Report issued in Taiwanese Patent Application No. 110109282.

May 25, 2021 Search Report issued in International Patent Application No. PCT/JP2021/009108.

Oct. 27, 2022 International Preliminary Report on Patentability issued in International Patent Application No. PCT/ JP2021/ 009108.

* cited by examiner

[FIG. 1]
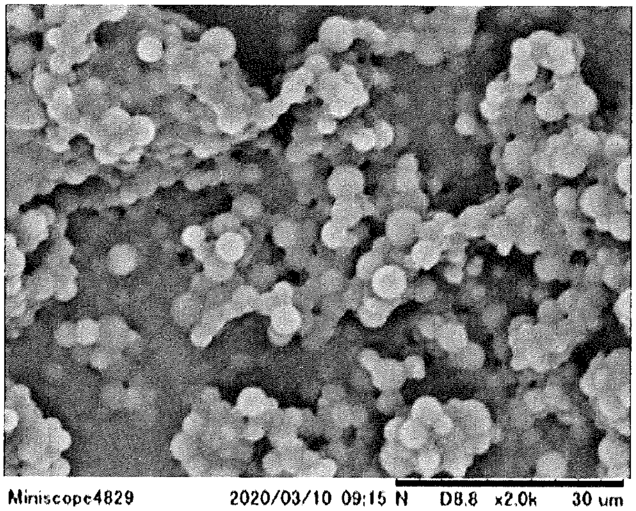
[FIG. 2]
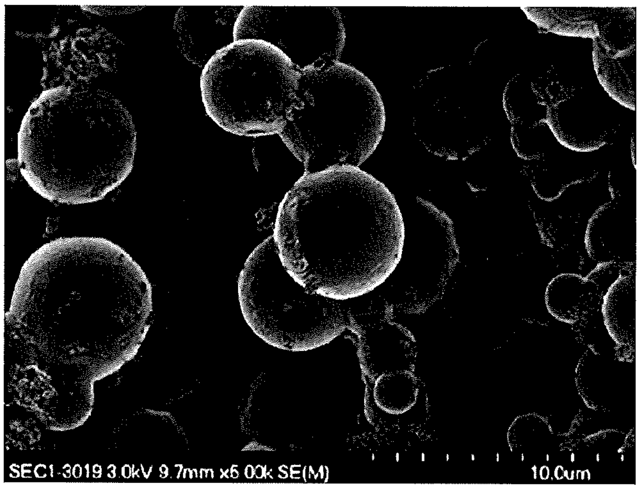
[FIG. 3]
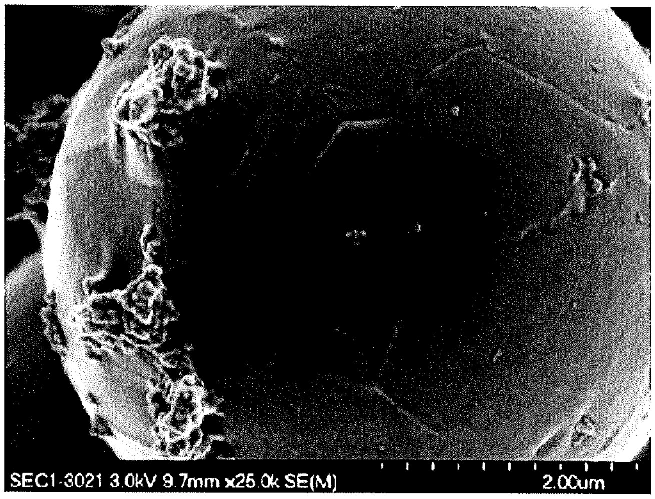

POLYETHER-POLYSILOXANE CROSSLINKED RUBBER SPHERICAL PARTICLE, METHOD FOR MANUFACTURING THE SAME, POLYETHER-POLYSILOXANE CROSSLINKED COMPOSITE PARTICLE, AND METHOD FOR MANUFACTURING THE SAME

TECHNICAL FIELD

The present invention relates to: a polyether-polysiloxane crosslinked rubber spherical particle; a method for manufacturing the same; a polyether-polysiloxane crosslinked composite particle; and a method for manufacturing the same.

BACKGROUND ART

Conventionally, uses for silicone rubber spherical particles and powders are proposed in a wide range of industrial fields. For example, addition and mixing in synthetic resin materials (e.g. see Patent Documents 1 and 2), synthetic rubber materials (e.g. see Patent Document 3), cosmetics (e.g. see Patent Documents 4 to 7), etc. are shown.

As indicated above, silicone rubber spherical particles making use of "flexibility" are mixed and used as an agent for providing lower stress to epoxy resin, for example. That is, due to a difference in coefficients of thermal expansion of electronic components and epoxy resin, stress is applied to the resin, and cracks are formed in some cases. This can be prevented by the addition of silicone rubber spherical particles.

Specifically, epoxy resins containing particles of cured polymer containing a linear organopolysiloxane block (e.g. Patent Document 8), epoxy resins containing particles obtained by coating the surfaces of silicone rubber particles with polyorganosilsesquioxane (e.g. Patent Document 9), etc. are proposed.

Furthermore, spherical organic crosslinked particles containing an organic compound and a silicon-containing organic compound are proposed as particles excellent in handling workability when used together with components such as various resins, paints, and rubbers (e.g. Patent Document 10).

In addition, silicone rubber spherical particles are used for a wide variety of cosmetics and cosmetic materials including make-up cosmetics, such as foundation and make-up base, foundations, such as cream and milky lotion, and sunscreen cosmetics, for the purpose of providing cosmetics with feelings on use, such as soft feeling and smoothness, or for the purpose of producing a natural finish by scattering light, making it difficult to see pores and wrinkles, etc.

For example, cosmetics containing a polymethylsilsesquioxane powder (e.g. Patent Document 11), make-up cosmetics containing a spherical silicone rubber powder (e.g. Patent Document 12), and cosmetics containing a composite silicone powder obtained by coating fine-spherical silicone rubber particles with a polyorganosilsesquioxane resin (e.g. Patent Document 13) are proposed. These silicone rubber spherical particles and particles obtained by coating silicone rubber spherical particles with a polyorganosilsesquioxane resin can also provide cosmetics with a soft feeling in addition to the above-described feeling on use.

CITATION LIST

Patent Literature

Patent Document 1: JP S63-12489 B
Patent Document 2: JP H6-55805 B
Patent Document 3: JP H2-102263 A
Patent Document 4: JP H8-12546 A
Patent Document 5: JP H8-12545 A
Patent Document 6: JP H4-17162 B
Patent Document 7: JP H4-66446 B
Patent Document 8: JP S58-219218 A
Patent Document 9: JP H8-85753 A
Patent Document 10: JP 2001-40214 A
Patent Document 11: JP S63-297313 A
Patent Document 12: JP H8-12524 A
Patent Document 13: JP H9-20631 A

SUMMARY OF INVENTION

Technical Problem

However, the above-described silicone rubber spherical particles have a problem of having poor dispersibility when mixing and using in thermoplastic resins, thermosetting resins, paints, cosmetic materials, etc., in particular, aqueous compositions.

In addition, in view of recent issues of marine plastic litter, there is desire for the development of materials in which spherical rubber particles exhibit degradability in response to external stimuli such as light, heat, acid, and base under a natural environment including soil, inland water, and the ocean, particularly in use as cosmetic materials.

The present invention has been made in view of the above circumstances, and an object thereof is to provide a rubber spherical particle, a composite particle, and methods for manufacturing the rubber spherical particle and the composite particle, the particles exhibiting excellent dispersibility when mixed and used in thermoplastic resins, thermosetting resins, paints, cosmetic materials, etc., in particular, aqueous compositions, and furthermore, exhibiting degradation characteristics in response to external stimuli.

Solution to Problem

To achieve the object, the present invention provides a polyether-polysiloxane crosslinked rubber spherical particle comprising an addition-reaction product of a composition comprising:

(A) a polyether having at least two aliphatic unsaturated groups in one molecule;

(B) an organohydrogenpolysiloxane shown by the following general formula (1), (1)

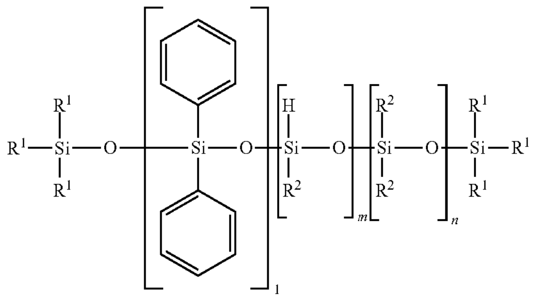

wherein $0<l\leq 1000$, $2\leq m\leq 1000$, $0\leq n\leq 1000$, $R^1$ independently represents a hydrogen atom, a monovalent hydrocarbon group having 1 to 12 carbon atoms that is unsubstituted or is substituted with a halogen atom, or an alkoxy group, and $R^2$ independently represents a monovalent hydrocarbon group having 1 to 20 carbon atoms, the organohydrogenpolysiloxane having at least two silicon-bonded hydrogen atoms in one molecule; and (C) a hydrosilylation-reaction catalyst;

excluding a combination where two of the aliphatic unsaturated groups are present in the component (A) in one molecule and two of the silicon-bonded hydrogen atoms are present in the component (B) in one molecule.

Such polyether-polysiloxane crosslinked rubber spherical particles can exhibit excellent dispersibility when mixed and used in an aqueous composition, and furthermore, can exhibit degradation characteristics in response to external stimuli.

In addition, the inventive polyether-polysiloxane crosslinked rubber spherical particles can exhibit excellent dispersibility in aqueous compositions, and therefore, can be contained in articles such as cosmetics containing an aqueous composition that is gentle on the skin, for example. An article that contains the inventive polyether-polysiloxane crosslinked rubber spherical particles can exhibit excellent feelings on use such as a soft feeling, smoothness, and so forth. Furthermore, the inventive polyether-polysiloxane crosslinked rubber spherical particles can exhibit excellent light-scattering ability, so that the article containing such rubber spherical particles can produce a natural finish, and can exhibit an effect of making pores, wrinkles, etc. difficult to see.

The component (A) is preferably a polyether having the aliphatic unsaturated groups in both terminal moieties in one molecule.

When such a component (A) is contained, excellent dispersibility can be exhibited when the particles are mixed and used in an aqueous composition, and furthermore, degradation characteristics can be exhibited in response to external stimuli.

The component (A) is further preferably a polypropylene glycol having the aliphatic unsaturated groups in both terminal moieties in one molecule.

When such a component (A) is contained, a stable emulsion can be formed in the preparation of the rubber spherical particles described below.

The component (B) is preferably an organohydrogenpolysiloxane having a value of a solubility parameter $\Delta$ of at least 7.5, the solubility parameter $\Delta$ being shown by the following equality (2):

$$\Delta=\rho\Sigma F/M \quad (2)$$

wherein "$\rho$" is a specific weight of the organohydrogenpolysiloxane, F is a molecular cohesive energy constant ($(cal\cdot cm^3)^{1/2}/mol$) of atoms and functional groups, and M is a molecular weight of the organohydrogenpolysiloxane.

Such a component (B) can exhibit excellent compatibility (solubility) with the component (A) in the composition. As a result, a composition containing the component (A) and such a component (B) can be a uniform curable composition.

The component (B) is more preferably a phenylorganohydrogenpolysiloxane that satisfies the following inequality (3):

$$(l/l+m+n+2)\times 100>10 \quad (3).$$

Such a component (B) can exhibit more excellent compatibility (solubility) with the component (A) in the composition. As a result, a composition containing the component (A) and such a component (B) can be a more uniform curable composition.

In addition, the present invention provides a polyether-polysiloxane crosslinked composite particle comprising:

the inventive polyether-polysiloxane crosslinked rubber spherical particle; and a spherical polyorganosilsesquioxane or silica adhered to a surface of the polyether-polysiloxane crosslinked rubber spherical particle.

Such a composite particle can exhibit excellent dispersibility in an aqueous composition, exhibit degradation characteristics in response to external stimuli, and in addition, can exhibit a softer feeling and more excellent light-scattering ability. Accordingly, such composite particles can realize articles such as cosmetics that exhibit more excellent feelings on use.

In addition, the present invention provides a method for manufacturing the inventive polyether-polysiloxane crosslinked rubber spherical particle, comprising the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iii) removing water, being an external phase, and water present in the polyether-polysiloxane crosslinked rubber spherical particle from the aqueous dispersion of the polyether-polysiloxane crosslinked rubber spherical particle obtained in the step (ii).

According to such a manufacturing method, it is possible to manufacture the inventive polyether-polysiloxane crosslinked rubber spherical particles, which can exhibit excellent dispersibility when mixed and used in an aqueous composition, and moreover, can exhibit degradation characteristics in response to external stimuli.

Furthermore, the present invention provides a method for manufacturing the inventive polyether-polysiloxane crosslinked composite particle, comprising the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iv) subjecting an organotrialkoxysilane or a tetraalkoxysilane to hydrolysis and polycondensation in the presence of the polyether-polysiloxane crosslinked rubber spherical particle obtained in the step (ii), water, and an alkaline substance to make a polyorganosilsesquioxane or silica adhere to the surface of the polyether-polysiloxane crosslinked rubber spherical particle.

According to such a manufacturing method, it is possible to manufacture the inventive polyether-polysiloxane crosslinked composite particles, which can exhibit excellent dispersibility in an aqueous composition, exhibit degradation characteristics in response to external stimuli, and in addition, can realize articles such as cosmetics that exhibit more excellent feelings on use.

Advantageous Effects of Invention

As described above, the inventive polyether-polysiloxane crosslinked rubber spherical particles can exhibit excellent dispersibility when mixed and used in an aqueous composition, and furthermore, can exhibit degradation characteristics in response to external stimuli. In addition, the inventive polyether-polysiloxane crosslinked rubber spherical particles can realize articles such as cosmetics that can exhibit excellent feelings on use such as a soft feeling and smoothness, can produce a natural finish, and can exhibit the effect of making pores and wrinkles difficult to see.

Furthermore, the inventive polyether-polysiloxane crosslinked composite particles can realize articles such as cosmetics that exhibit more excellent feelings on use.

In addition, according to the inventive method for manufacturing the polyether-polysiloxane crosslinked rubber spherical particle, it is possible to manufacture the inventive polyether-polysiloxane crosslinked rubber spherical particles, which can exhibit excellent dispersibility when mixing and using in an aqueous composition, and can further exhibit degradation characteristics in response to external stimuli.

Furthermore, according to the inventive method for manufacturing the polyether-polysiloxane crosslinked composite particle, it is possible to manufacture the inventive polyether-polysiloxane crosslinked composite particles that can realize articles such as cosmetics, which can exhibit excellent dispersibility in an aqueous composition, exhibit degradation characteristics in response to external stimuli, and moreover, exhibit more excellent feelings on use.

BRIEF DESCRIPTION OF DRAWINGS

FIG. 1 is an electron microscope photograph of the surfaces of polyether-polysiloxane crosslinked rubber spherical particles (powder), obtained in Example 7.

FIG. 2 is an electron microscope photograph of the surfaces of polyether-polysiloxane crosslinked composite particles obtained in Example 7.

FIG. 3 is an electron microscope photograph of the surface of a polyether-polysiloxane crosslinked composite particle obtained in Example 7 at a different magnification.

DESCRIPTION OF EMBODIMENTS

As described above, it has been desired to develop rubber spherical particles, composite particles, and manufacturing methods thereof, the particles exhibiting excellent dispersibility when mixed and used in an aqueous composition, and moreover, exhibiting degradation characteristics in response to external stimuli.

The present inventors have earnestly studied the problems, and found a polyether-polysiloxane crosslinked rubber spherical particle containing an addition-reaction product of a composition containing: a polyether having at least two aliphatic unsaturated groups in one molecule; and a polysiloxane having a particular structure. Furthermore, the present inventors have found out that such rubber spherical particles can exhibit excellent dispersibility in an aqueous composition and can exhibit degradation characteristics in response to external stimuli, and completed the present invention. In addition, the present inventors have found a polyether-polysiloxane crosslinked composite particle in which polyorganosilsesquioxane or silica is adhered to the surface of the rubber spherical particle, and furthermore, methods for manufacturing the particles, and have come to complete the present invention.

That is, the present invention is a polyether-polysiloxane crosslinked rubber spherical particle comprising an addition-reaction product of a composition comprising:

(A) a polyether having at least two aliphatic unsaturated groups in one molecule;

(B) an organohydrogenpolysiloxane shown by the following general formula (1), (1)

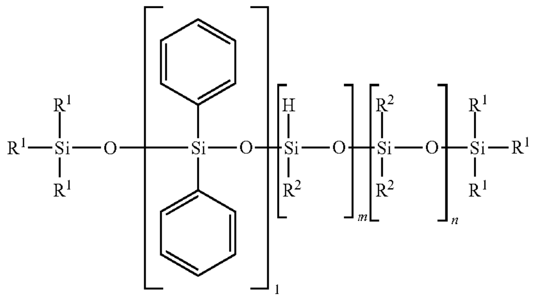

wherein $0<l\leq 1000$, $2\leq m\leq 1000$, $0\leq n\leq 1000$, $R^1$ independently represents a hydrogen atom, a monovalent hydrocarbon group having 1 to 12 carbon atoms that is unsubstituted or is substituted with a halogen atom, or an alkoxy group, and $R^2$ independently represents a monovalent hydrocarbon group having 1 to 20 carbon atoms, the organohydrogenpolysiloxane having at least two silicon-bonded hydrogen atoms in one molecule; and (C) a hydrosilylation-reaction catalyst;

excluding a combination where two of the aliphatic unsaturated groups are present in the component (A) in one molecule and two of the silicon-bonded hydrogen atoms are present in the component (B) in one molecule.

In addition, the present invention is a polyether-polysiloxane crosslinked composite particle comprising:

the inventive polyether-polysiloxane crosslinked rubber spherical particle; and a spherical polyorganosilsesquioxane or silica adhered to a surface of the polyether-polysiloxane crosslinked rubber spherical particle.

In addition, the present invention is a method for manufacturing the inventive polyether-polysiloxane crosslinked rubber spherical particle, comprising the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iii) removing water, being an external phase, and water present in the polyether-polysiloxane crosslinked rubber spherical particle from the aqueous dispersion of the polyether-polysiloxane crosslinked rubber spherical particle obtained in the step (ii).

Furthermore, the present invention provides a method for manufacturing the inventive polyether-polysiloxane crosslinked composite particle, comprising the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iv) subjecting an organotrialkoxysilane or a tetraalkoxysilane to hydrolysis and polycondensation in the presence of the polyether-polysiloxane crosslinked rubber spherical particle obtained in the step (ii), water, and an alkaline substance to make a polyorganosilsesquioxane or silica adhere to the surface of the polyether-polysiloxane crosslinked rubber spherical particle.

Hereinafter, the present invention will be described in further detail, but the present invention is not limited thereto.

<Polyether-Polysiloxane Crosslinked Rubber Spherical Particle>

The inventive polyether-polysiloxane crosslinked rubber spherical particle contains an addition-reaction product of a composition containing the component (A), the component (B), and the component (C).

In other words, it can be said that the inventive polyether-polysiloxane crosslinked rubber spherical particle is characterized in that the components that form the particle is constituted by both the component (A) polyether and the component (B) polysiloxane.

The inventive polyether-polysiloxane crosslinked rubber spherical particle is the above-described addition-reaction product, and, however, can also contain other components. Details of each component is described below.

The polyether-polysiloxane crosslinked rubber spherical particles in the present invention preferably have a volume average particle size of 0.5 to 100 μm, more preferably 1 to 30 μm. When the volume average particle size is within the above ranges, the polyether-polysiloxane crosslinked rubber spherical particles have lower agglomeration, and are readily dispersed to primary particles, and in addition, dry feeling is enhanced. In addition, by setting the volume average particle size to 100 μm or less, rough feeling can be reduced, and furthermore, rough feeling can be eliminated. Note that the volume average particle size in the present invention is measured by an electric resistance method when 1 μm or more, and by a laser diffraction scattering method when less than 1 μm, in accordance with the particle size of the obtained polyether-polysiloxane crosslinked rubber spherical particles.

The rubber constituting the polyether-polysiloxane crosslinked rubber spherical particles is preferably not sticky, and preferably has a rubber hardness within the range of 5 to 90, more preferably within the range of 10 to 70 as measured by Type A Durometer according to JIS K 6253. When the rubber hardness is 5 or more, agglomeration of the rubber spherical particles can be suppressed sufficiently so that the particles can easily disperse to primary particles, and in addition, dry feeling can be sustained. Meanwhile, when the rubber hardness is 90 or less, the polyether-polysiloxane crosslinked composite particles described below can be obtained easily.

Hereinafter, the components related to the inventive polyether-polysiloxane crosslinked rubber spherical particles will be described.

[Addition-Reaction Product of Composition Containing Components (A) to (C)]

As stated above, the inventive polyether-polysiloxane crosslinked rubber spherical particles contain an addition-reaction product of a composition containing the component (A), the component (B), and the component (C). Hereinafter, this composition will be referred to as an addition-reaction composition.

The addition-reaction composition can also be described as a curable composition that can undergo an addition-curing reaction. In addition, the addition-reaction composition may also be liquid. That is, this addition-reaction composition may be a curable liquid composition.

In addition, the addition-reaction composition can also contain components other than the components (A) to (C).

Below, each component of the addition-reaction composition will be described.

[Component (A)]

In the present invention, the component (A) of the addition-reaction composition is a polyether that has at least two (for example, 2 to 10) aliphatic unsaturated groups in one molecule.

The structure having these aliphatic unsaturated groups can be a structure obtained by a conventionally known manufacturing method, and a molecule having an aliphatic unsaturated group on a molecular terminal can be introduced to a polyether (polymer) via an ester bond, a phosphate bond, an ether bond, a urethane bond, a urea bond, an amide bond, a sulfide bond, etc.

Examples of functional groups having the aliphatic unsaturated groups in the component (A) include functional groups of the end of the molecular chain or a side chain of the molecular chain, for example, alkenyl groups, such as a vinyl group, an allyl group, a propenyl group, a butenyl group, a pentenyl group, and a hexenyl group; alkynyl groups, such as an ethynyl group; cyclic unsaturated groups, such as a norbornene group, and a dicyclopentadienyl group. Preferable examples include functional groups of the end of the molecular chain or a side chain of the molecular chain such as a vinyl group and an allyl group.

The component (A) polyether preferably has a kinematic viscosity at 25° C. of 100,000 $mm^2/s$ or less, more preferably 10,000 $mm^2/s$ or less. When the kinematic viscosity is 100,000 $mm^2/s$ or less, it is possible to obtain particles having a sufficiently narrow particle size distribution in the inventive manufacturing methods described below. The lower limit is not particularly restricted, but the kinematic viscosity is preferably 1 $mm^2/s$ or more. Note that the kinematic viscosity in the present invention indicates a value measured by an Ostwald viscometer at 25° C.

Examples of such a component (A) include polyethers obtained by subjecting an allyl glycidyl ether to ring-opening polymerization while using diallyl ether; polyethylene glycol-diallyl ether, methoxy polyethylene glycol-diallyl ether, polyethylene glycol/polypropylene glycol-diallyl ether, polypropylene glycol-diallyl ether, polybutylene glycol-diallyl ether, butoxy polyethylene glycol-polypropylene glycol diallyl ether, triethylene glycol-divinyl ether, cyclohexanedimethanol-divinyl ether, or ethylene glycol as an initiator, polyethers obtained by subjecting vinyl cyclohexane-1,2-epoxide to ring-opening polymerization while using butanol, allyl alcohol, propargyl alcohol, or the like as an initiator, etc.

The structure of the component (A) may be any of the above, but is preferably a polyether having the aliphatic unsaturated groups in the terminal moieties in one molecule, according to the inventive manufacturing method described below, and polypropylene glycol-diallyl ether and polybutylene glycol-diallyl ether are particularly preferable.

The component (A) is further preferably a polypropylene glycol having the aliphatic unsaturated groups in both terminal moieties in one molecule. Specific examples thereof include polypropylene glycol-diallyl ether.

[Component (B)]

The component (B) of the addition-reaction composition in the present invention is an organohydrogenpolysiloxane shown by the following general formula (1) and having at least two (for example, 2 to 1,000) silicon-bonded hydrogen atoms in one molecule.

(1)

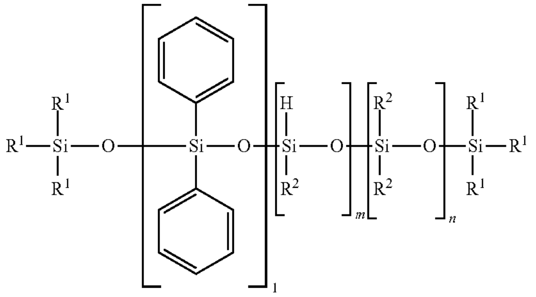

($0<l\leq1000$, $2\leq m\leq1000$, $0\leq n\leq1000$)

[$R^1$ independently represents a hydrogen atom, a monovalent hydrocarbon group having 1 to 12 carbon atoms that is unsubstituted or is substituted with a halogen atom, or an alkoxy group. $R^2$ independently represents a monovalent hydrocarbon group having 1 to 20 carbon atoms.]

In the general formula (1), "1" is greater than 0, and therefore, the component (B) organohydrogenpolysiloxane has phenyl groups. Accordingly, the component (B) organohydrogenpolysiloxane can also be referred to as a phenylorganohydrogenpolysiloxane.

Examples of the $R^1$ include a hydrogen atom, alkyl groups, such as a methyl group, an ethyl group, a propyl group, a butyl group, a pentyl group, a hexyl group, a heptyl group, an octyl group, a decyl group, an undecyl group, a dodecyl group, and a tetradecyl group; alkenyl groups, such as a vinyl group and an allyl group; cycloalkyl groups, such as a cyclopentyl group, a cyclohexyl group, and a cycloheptyl group, an alkoxy group; and hydrocarbon groups in which some or all of the hydrogen atoms bonded to the carbon atoms of these functional groups are substituted with atoms such as halogen atoms (fluorine, chlorine, bromine, and iodine atoms) and/or substituents such as an acryloxy group, a methacryloxy group, an epoxy group, a glycidoxy group, and a carboxy group. Industrially, 50 mol % or more of all the $R^1$ groups are preferably methyl groups.

Examples of the $R^2$ include alkyl groups such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group, and an icosyl group. Industrially, 50 mol % or more of all the $R^2$ groups are preferably methyl groups.

Note that the addition-reaction composition excludes a combination where two of the aliphatic unsaturated groups are present in the component (A) in one molecule and two of the silicon-bonded hydrogen atoms (hydrosilyl groups: SiH groups) are present in the component (B) in one molecule.

Such an addition-reaction composition can cause an addition reaction by crosslinking. On the other hand, in a combination where two of the aliphatic unsaturated groups are present in the component (A) in one molecule and two of the silicon-bonded hydrogen atoms are present in the component (B) in one molecule, it is not possible to cause an addition reaction by crosslinking.

The component (B) is preferably an organohydrogenpolysiloxane having a value (SP value) of a solubility parameter Δ of at least 7.5, the solubility parameter Δ being shown by the following equality (2):

$$\Delta=\rho\Sigma F/M \quad (2)$$

In equality (2), "ρ" is a specific weight of the organohydrogenpolysiloxane, F is a molecular cohesive energy constant ($(cal\cdot cm^3)^{1/2}/mol$) of atoms and functional groups, and M is a molecular weight of the organohydrogenpolysiloxane.

Such a component (B) can exhibit excellent compatibility (solubility) with the component (A) in the composition. As a result, a composition containing the component (A) and such a component (B) can be a uniform curable composition.

The upper limit of the SP value is not particularly limited, and the SP value can be, for example, 25 or less.

Furthermore, the component (B) is more preferably a phenylorganohydrogenpolysiloxane that satisfies the following inequality (3):

$$(l/l+m+n+2)\times100>10 \quad (3).$$

Such a component (B) can exhibit more excellent compatibility (solubility) with the component (A) in the composition. As a result, a composition containing the component (A) and such a component (B) can be a more uniform curable composition.

The component (B) organohydrogenpolysiloxane preferably has a kinematic viscosity at 25° C. of 10,000 $mm^2/s$ or less, more preferably 1,000 $mm^2/s$ or less. When the kinematic viscosity is 10,000 $mm^2/s$ or less as given above, the component (B) can exhibit sufficient compatibility with the component (A). In addition, particles having a sufficiently narrow particle size distribution can be obtained in the inventive manufacturing method described below. The lower, limit is not particularly limited, but the kinematic viscosity is preferably 1 $mm^2/s$ or more.

Furthermore, the structure of the phenylorganohydrogenpolysiloxane can be any of linear, cyclic, or branched, but is particularly preferably linear.

In the addition-reaction composition, the component (B) preferably contains the silicon-bonded hydrogen atoms (hydrosilyl groups: SiH groups) of the component (B) in an amount of 0.5 to 2.0, more preferably 0.8 to 1.7 based on 1 aliphatic unsaturated group of the component (A).

[Component (C)]

The component (C) hydrosilylation-reaction catalyst can be a known or well-known catalyst used in hydrosilylation-reactions. Examples thereof include platinum group metal elements, such as platinum (including platinum black), rhodium, and palladium; platinum chloride, chloroplatinic acid, and chloroplatinic acid salts, such as $H_2PtC_{14}\cdot kH_2O$, $H_2PtCl_6\cdot kH_2O$, $NaHPtCl_6\cdot kH_2O$, $KHPtCl_6\cdot kH_2O$, $Na_2PtCl_6\cdot kH_2O$, $K_2PtCl_4\cdot kH_2O$, $PtCl_4\cdot kH_2O$, and $Na_2HPtCl_4\cdot kH_2O$ (where "k" in the formulae is an integer of 0 to 6, preferably 0 or 6); alcohol-modified chloroplatinic acid (see U.S. Pat. No. 3,220,972 A); complexes of chloroplatinic acid with olefins (see U.S. Pat. Nos. 3,159,601 A, 3,159,662 A, and 3,775,452 A); platinum group metals, such as platinum black and palladium supported on supports such as alumina, silica, and carbon; rhodium-olefin complexes; chlorotris(triphenylphosphine)rhodium (Wilkinson's catalyst); complexes of platinum, platinum chloride, chloroplatinic acid or chloroplatinic acid salts with vinyl group-containing siloxanes, particularly; platinum with vinyl group-containing disiloxanes or with vinyl group-containing cyclic siloxanes; and the like.

The amount of the hydrosilylation-reaction catalyst to be contained can be an effective amount for promoting a hydrosilylation-reaction. When the contained amount of the catalyst is an appropriate amount, it is possible to prevent the polyether moiety of the surfactant described below from oxidizing and prevent odors from being generated. In addition, obtained particles can be prevented from blackening. In particular, the amount of the platinum group metal in the catalyst in terms of mass is preferably 0.1 to 100 ppm (mass), more preferably 0.5 to 50 ppm, and further preferably 1 to 30 ppm, based on the total mass of the polyether and the organohydrogenpolysiloxane.

[Component (D)]

The present invention can further contain an additive component (D), that is, a reaction controller for the purpose of controlling curing reactivity owing to the component (C): hydrosilylation-reaction catalyst of the addition-reaction composition. The reaction controller is not particularly limited as long as it is a compound that has an effect of suppressing curing on the platinum group metal-based catalyst of the component (C), those conventionally known can be used. Examples thereof include various organic nitrogen compounds, organic phosphorus compounds, acetylene-based compounds, oxime compounds, organochlorine compounds, diallyl maleate, triallyl isocyanurate, etc.

Examples of the component (D) include acetylene-based alcohols, such as 3-methyl-1-butyne-3-ol, 3,5-dimethyl-1-hexyne-3-ol, 3-methyl-1-pentene-3-ol, phenylbutynol, and 1-ethynyl cyclohexanol; acetylene-based compounds, such as 3-methyl-3-1-penten-1-yne and 3,5-dimethyl-1-hexyne-3-yne; reaction products of these acetylene-based compounds and an alkoxysilane, a siloxane, or a hydrogensilane; vinylsiloxanes, such as a cyclic tetramethylvinylsiloxane; organic nitrogen compounds, such as a benzotriazole; and other organic phosphorus compounds, oxime compounds, organochromium compounds, and the like. The contained amount of these compounds can be an amount at which a favorable reaction-controllability can be obtained. Generally, the amount is preferably 0.01 to 10 parts by mass, more preferably 0.05 to 5 parts by mass, based on a total of 100 parts by mass of the components (A) and (B).

[Other Blended Components]

The curable liquid composition constituting the inventive polyether-polysiloxane crosslinked rubber spherical particle due to an addition reaction optionally contains appropriate amounts of other components in addition to the components (A) to (C) and the optional component (D). Examples of the other components include the following, and one of these can be used, or an appropriate combination of two or more thereof can be used.

[Antioxidant]

In the addition-reaction composition of the present invention, aliphatic unsaturated groups in the component (A), that is, addition-reactive carbon-carbon double bonds remain unreacted in some cases, and it is possible to prevent coloring, degradation of the polyether itself, and so forth by adding an antioxidant as necessary.

As the antioxidant, any conventionally known antioxidant can be used. Examples thereof include 2,6-di-t-butyl-4-methylphenol, 2,5-di-t-amylhydroquinone, 2,5-di-t-butylhydroquinone, 4,4'-butylidenebis(3-methyl-6-t-butylphenol), 2,2'-methylenebis(4-methyl-6-t-butylphenol), 2,2'-methylenebis(4-ethyl-6-t-butylphenol), and the like.

When an antioxidant is used, the contained amount thereof can be an amount effective as an antioxidant, and is not particularly limited, but is usually preferably 10 to 10,000 ppm (mass), more preferably 100 to 1,000 ppm, based on the total mass of the components (A) and (B). When the contained amount is within such ranges, antioxidation ability is sufficiently exhibited, so that it is possible to obtain a cured material in which coloring, clouding, degradation by oxidation, etc. do not occur.

[Components Other Than Addition-Reaction Product]

The inventive polyether-polysiloxane crosslinked rubber spherical particle may further contain silicone oil, an inorganic powder, an organic powder, and so forth in the particle.

<Polyether-Polysiloxane Crosslinked Composite Particle>

The inventive polyether-polysiloxane crosslinked composite particle includes the inventive polyether-polysiloxane crosslinked rubber spherical particle and a spherical polyorganosilsesquioxane or silica adhered to the surface of the polyether-polysiloxane crosslinked rubber spherical particle. The inventive polyether-polysiloxane crosslinked composite particle can also be described as a particle formed by a spherical polyorganosilsesquioxane or silica adhering to the surface of the inventive polyether-polysiloxane crosslinked rubber spherical particle. The spherical polyorganosilsesquioxane or silica may also be adsorbed onto the surface of the inventive polyether-polysiloxane crosslinked rubber spherical particle. Light-scattering ability is enhanced by the spherical polyorganosilsesquioxane or silica adhering to the particle.

[Polyorganosilsesquioxane]

The shape of the polyorganosilsesquioxane in the polyether-polysiloxane crosslinked composite particle is spherical, and is preferably spherical (true spherical shape) or hemispherical. The spherical polyorganosilsesquioxane preferably has a particle size of 10 to 500 nm, more preferably 20 to 200 nm. When the polyorganosilsesquioxane has the particle size of 10 nm or more, sufficient light-scattering ability can be obtained. Meanwhile, when the particle size is 500 nm or less, the touch of the obtained composite particle is excellent, and sufficient light-scattering ability can be achieved. Here, the particle size of the polyorganosilsesquioxane is preferably smaller than the particle size of the polyether-polysiloxane crosslinked rubber spherical particle.

The polyorganosilsesquioxane can adhere to all or part of the surface of the polyether-polysiloxane crosslinked rubber spherical particle. Specifically, the polyorganosilsesquioxane may adhere to the surface sparsely or may adhere to the surface leaving no spaces, but from the viewpoint that a polyether-polysiloxane crosslinked composite particle excellent in light-scattering property can be obtained, adhesion density is preferably high. Note that the shape and particle size of the polyorganosilsesquioxane and the adhesion density at the surface of the rubber spherical particle can be checked by observing the obtained composite particles with an electron microscope.

The polyorganosilsesquioxane is, for example, a resinous solid obtained by units shown by $R^3SiO_{3/2}$ being crosslinked in a three-dimensional network. The $R^3$ represents a substituted or unsubstituted monovalent hydrocarbon group having 1 to 20 carbon atoms. Examples of the $R^3$ include alkyl groups, such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group, and an icosyl group; aryl groups, such as a phenyl group, a tolyl group, and a naphthyl group; aralkyl groups, such as a benzyl group and a phenethyl group; alkenyl groups, such as a vinyl group and an allyl group; cycloalkyl groups, such as a cyclopentyl group, a cyclohexyl group, and a cycloheptyl group; hydrocarbon groups in which some or all of the hydrogen atoms bonded to the carbon atoms of these functional groups are substituted with atoms such as halogen atoms (fluorine, chlorine, bromine, and iodine atoms) and/or substituents such as an amino group, an acryloxy group, a methacryloxy group, an epoxy group, a glycidoxy group, and a carboxy group; and the like.

In order to make the polyorganosilsesquioxane adhere to the surface of the polyether-polysiloxane crosslinked rubber spherical particle by the inventive manufacturing method described below, 50 mol % or more of the $R^3$s are preferably a methyl group, a vinyl group, or a phenyl group, more preferably 80 mol % or more, and further preferably, 90 mol % or more are the above groups, in view of reactivity and so forth.

The amount of the polyorganosilsesquioxane adhered to the surface of the polyether-polysiloxane crosslinked rubber spherical particles is preferably 1 to 50 parts by mass, more preferably 2 to 25 parts by mass, based on 100 parts by mass of the polyether-polysiloxane crosslinked rubber spherical particles. When the amount of the polyorganosilsesquioxane is 1 part by mass or more, the obtained polyether-polysiloxane crosslinked composite particles can exhibit sufficient light-scattering ability, and in addition, can exhibit a dry touch. When the amount of the polyorganosilsesquioxane is 50 parts by mass or less, the obtained composite particles can exhibit a sufficiently soft touch.

The polyorganosilsesquioxane may contain at least one selected from an $R^3{}_2SiO_{2/2}$ unit, an $R^3{}_3SiO_{1/2}$ unit, and an $SiO_{4/2}$ unit at any proportion besides the $R^3SiO_{3/2}$ unit. In such a polyorganosilsesquioxane, the $R^3SiO_{3/2}$ unit content is preferably within a range of 70 to 100 mol %, more preferably 80 to 100 mol % of all siloxane units.

[Silica]

The silica is, for example, obtained by a hydrolysis-polycondensation reaction of tetraalkoxysilane, and includes an $SiO_2$ unit, and can also contain alkoxy groups originating from raw material tetraalkoxysilane or silanol groups that did not undergo a condensation reaction.

The shape of the silica is spherical, and is preferably spherical (true spherical shape) or hemispherical. In addition, the spherical silica preferably has a particle size of 500 nm or less. Here, the particle size of the silica is preferably smaller than the particle size of the polyether-polysiloxane crosslinked rubber spherical particles.

The silica adheres to all or part of the surface of the polyether-polysiloxane crosslinked rubber spherical particle. Specifically, the silica may adhere to the surface sparsely or may adhere to the surface leaving no spaces, but the surface is preferably covered with almost no spaces, and the adhesion density is preferably high. Note that the shape and particle size of the coating silica can be checked by observing the surface of the composite particles with an electron microscope.

<Method for Manufacturing Polyether-Polysiloxane Crosslinked Rubber Spherical Particle>

In addition, the present invention provides a method for manufacturing the inventive polyether-polysiloxane crosslinked rubber spherical particle described above. This method includes the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iii) removing water, being an external phase, and water present in the polyether-polysiloxane crosslinked rubber spherical particle from the aqueous dispersion of the polyether-polysiloxane crosslinked rubber spherical particle obtained in the step (ii).

The inventive polyether-polysiloxane crosslinked rubber spherical particles can, for example, be obtained by this method. However, the inventive polyether-polysiloxane crosslinked rubber spherical particles may also be manufactured by other methods.

Hereinafter, each step will be described in more detail.

[Step (i)]

Step (i) is a step of obtaining an O/W type emulsion (oil-in-water type emulsion) including an oil phase component containing the above-described component (A) and the above-described component (B) and an aqueous phase component.

For example, the O/W type emulsion can be obtained by adding a surfactant and water to a composition containing the component (A) and the component (B) and performing an emulsification treatment.

The surfactant is used as an "emulsifier" for emulsification by mixing with the composition containing the components (A) and (B) and water to form an emulsion. The surfactant is not particularly limited, and examples include nonionic surfactants, anionic surfactants, cationic surfactants, zwitterionic surfactants, etc. One kind of the surfactant may be used, or two or more kinds thereof may be used appropriately in combination.

Examples of the nonionic surfactants include a polyoxyethylene alkyl ether, a polyoxyethylene polyoxypropylene alkyl ether, a polyoxyethylene alkyl phenyl ether, a polyethylene glycol-fatty acid ester, a sorbitan-fatty acid ester, a polyoxyethylene sorbitan-fatty acid ester, a polyoxyethylene sorbit-fatty acid ester, a glycerin-fatty acid ester, a polyoxyethylene glycerin-fatty acid ester, a polyglycerin-fatty acid ester, a propylene glycol-fatty acid ester, a polyoxyethylene castor oil, a polyoxyethylene hydrogenated castor oil, a polyoxyethylene hydrogenated castor oil-fatty acid ester, a polyoxyethylene alkylamine, a polyoxyethylene fatty acid amide, a polyoxyethylene-modified organopolysiloxane, a polyoxyethylene-polyoxypropylene-modified organopolysiloxane, etc.

Examples of the anionic surfactants include an alkyl sulfate ester salt, a polyoxyethylene alkyl ether sulfate ester salt, a polyoxyethylene alkyl phenyl ether sulfate ester salt, an alkylbenzene sulfonate, a polyoxyethylene alkyl phenyl ether sulfonate, an α-olefin sulfonate, an alkyl naphthalene sulfonate, an alkyl diphenyl ether disulfonate, a dialkyl sulfosuccinate, a monoalkyl sulfosuccinate, a polyoxyethylene alkyl ether sulfosuccinate, a fatty acid salt, a polyoxyethylene alkyl ether carboxylate, an N-acylamino acid salt, a monoalkyl phosphate ester salt, a dialkyl phosphate ester salt, a polyoxyethylene alkyl ether phosphate ester salt, and the like.

Examples of the cationic surfactants include an alkyltrimethylammonium salt, a dialkyldimethylammonium salt, a polyoxyethylene alkyl dimethyl ammonium salt, a dipolyoxyethylene alkyl methyl ammonium salt, an alkylbenzyl dimethyl ammonium salt, a monoalkylamine salt, a monoalkylamidoamine salt, and the like.

Examples of the zwitterionic surfactants include alkyl dimethylamine oxide, alkyl dimethyl carboxybetaine, alkylamidopropyl dimethylcarboxybetaine, alkylhydroxysulfobetaine, and the like.

One kind of the surfactants may be used, or an appropriate combination of two or more kinds thereof may be used. In particular, nonionic surfactants are preferable, since a composition containing the components (A) and (B) can be emulsified with a small amount, and fine polyether-polysiloxane crosslinked rubber spherical particles having a narrow particle size distribution can be manufactured.

The amount of the surfactant to be used is preferably 0.01 to 20 parts by mass, more preferably 0.05 to 5 parts by mass, based on 100 parts by mass of the composition containing the components (A) and (B). When the used amount is 0.01 to 20 parts by mass, a stable emulsion can be formed, and sufficient polyether-polysiloxane crosslinked rubber spherical particles that are fine and have a narrow particle size distribution can be obtained.

The O/W type emulsion can also further contain the component (C) in addition to the components (A) and (B) in some cases.

The component (C) is a hydrosilylation-reaction catalyst (e.g. a platinum group metal-based catalyst). When the dispersibility of the catalyst in water is low, the catalyst in a state of being dissolved in a surfactant is preferably added to the emulsion. As the surfactant used in this event, those described above can be used, and in particular, a nonionic surfactant is preferable.

The component (C) may be added beforehand in the composition containing the components (A) and (B). In this case, the emulsification is preferably performed taking reactivity, temperature, and reaction time into consideration so that the curable liquid composition does not cure in a stage before the emulsification step is completed. In addition, a reaction controller (component (D)) may be blended in the composition in advance.

Note that the component (C) may be added to the addition-reaction composition at any point in time, as long as the component (C) is added before the addition-curing reaction.

The emulsification method can be performed using a common emulsifying and dispersing apparatus, and is not limited thereto. Examples of the emulsifying and dispersing apparatus include high-speed rotary shear stirrers, such as a homomixer, high-speed rotary centrifugal stirrers, such as a homogenizing disper, high-pressure jetting emulsifying and dispersing apparatuses, such as a homogenizer, a colloid mill, an ultrasonic emulsifier, and the like.

[Step (ii)]

Step (ii) is a step of curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle.

The aqueous dispersion of the polyether-polysiloxane crosslinked rubber spherical particle can be manufactured by, for example, adding the component (C) to the O/W type emulsion (not containing the component (C)) obtained by the above-described emulsification method and subjecting the components (A) and (B) contained in the oil phase component of the emulsion to an addition-curing reaction.

Alternatively, the aqueous dispersion can also be manufactured by obtaining the O/W type emulsion containing the component (C) as described above and subjecting the components (A) and (B) contained in the oil phase component of the emulsion to an addition-curing reaction.

The addition-curing reaction may be performed under room temperature, but when the reaction does not become completed, the reaction can be performed under heating at lower than 100° C. As temperature conditions, 20 to 60° C. is preferable, and 30 to 50° C. is more preferable. When the reaction temperature is 20 to 60° C., the curing reaction progresses sufficiently and stability of the emulsion can also be maintained, so that the target polyether-polysiloxane crosslinked rubber spherical particles can be obtained sufficiently.

[Step (iii)]

Step (iii) is a step of removing water, being an external phase, and water present in the polyether-polysiloxane crosslinked rubber spherical particle from the aqueous dispersion of the polyether-polysiloxane crosslinked rubber spherical particle obtained in the step (ii).

In a case where polyether-polysiloxane crosslinked composite particles are not to be formed, the polyether-polysiloxane crosslinked rubber spherical particles are obtained as a powder in this step (iii). Specific methods are the same as the step of obtaining composite particles as a powder described below. For example, the liquid, water, etc. impregnated in the rubber spherical particles are removed by volatilization. Thus, the water, which is an external phase, and the water present in the polyether-polysiloxane crosslinked rubber spherical particles are removed to obtain rubber spherical particles as a powder.

Thus, as one embodiment, the inventive polyether-polysiloxane crosslinked rubber spherical particles can be obtained by the following method, for example.

Firstly, a surfactant and water are added to a composition containing the component (A) and the component (B), in some cases, after adding the component (C), and then an emulsification treatment is performed to form an emulsion. Subsequently, the component (A) and the component (B) are subjected to an addition-curing reaction in the presence of the component (C). An aqueous dispersion having the target structure (rubber spherical particle) can be obtained by such a crosslinking and rubber-forming method. Polyether-polysiloxane crosslinked rubber spherical particles can be obtained by removing the external phase water and the water present in the rubber spherical particles from this aqueous dispersion. Details of each step are as described above.

As another embodiment, the inventive polyether-polysiloxane crosslinked rubber spherical particles can be obtained, for example, by the following method.

Firstly, a composition containing the component (A), the component (B), and the additive component (D) is provided. The component (C) is added to this composition, the composition being stored at a low temperature (20° C. or lower), and then a surfactant and water are immediately added and an emulsification treatment is performed to obtain an emulsion. The emulsion is subjected to an addition-curing reaction by heating and aging (30° C. or higher). An aqueous dispersion having the target structure (rubber spherical particle) can be obtained by such a crosslinking and rubber-forming method. Polyether-polysiloxane crosslinked rubber spherical particles can be obtained by removing the external phase water and the water present in the rubber spherical particles from this aqueous dispersion. Details of each step are as described above.

<Method for Manufacturing Polyether-Polysiloxane Crosslinked Composite Particle>

In addition, the present invention provides a method for manufacturing the above-described inventive polyether-polysiloxane crosslinked composite particle. This method includes the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iv) subjecting an organotrialkoxysilane or a tetraalkoxysilane to hydrolysis and polycondensation in the presence of the polyether-polysiloxane crosslinked rubber spherical particle obtained in the step (ii), water, and an alkaline substance to make a polyorganosilsesquioxane or silica adhere to the surface of the polyether-polysiloxane crosslinked rubber spherical particle.

The inventive polyether-polysiloxane crosslinked composite particles can be obtained by this method, for example. However, the inventive polyether-polysiloxane crosslinked composite particles may also be manufactured by other methods.

Hereinafter, each step will be described in more detail.

[Step (i)]

Step (i) of the inventive method for manufacturing the polyether-polysiloxane crosslinked composite particle is the same as the step (i) of the method for manufacturing the polyether-polysiloxane crosslinked rubber spherical particle described above.

By setting the amount of the surfactant optionally used in step (i) to 0.01 to 20 parts by mass, a stable emulsion can be formed, and sufficient polyether-polysiloxane crosslinked rubber spherical particles that are fine and have a narrow particle size distribution can be obtained. In addition, by setting the amount of the surfactant used within the above range, polyorganosilsesquioxane or silica can be sufficiently adhered to the surfaces of the polyether-polysiloxane crosslinked rubber spherical particles, according to the inventive manufacturing method.

[Step (ii)]

Step (ii) of the inventive method for manufacturing the polyether-polysiloxane crosslinked composite particle is the same as the step (ii) of the method for manufacturing the polyether-polysiloxane crosslinked rubber spherical particle described above.

Note that in the step (ii) of this method, the aqueous dispersion can also be manufactured in the form of an aqueous dispersion of polyether-polysiloxane crosslinked rubber spherical particles impregnated with silicone oil. In addition, the component (C) may be added at any point in time as long as the component (C) is added before the addition-curing reaction.

Examples of the liquid that the polyether-polysiloxane crosslinked rubber spherical particles are to be impregnated with include organopolysiloxane. Examples of the organopolysiloxane include those that can be shown by an average composition formula $R^4_aSiO_{(4-a)/2}$. In the formula, $R^4$ represents an unsubstituted or substituted monovalent hydrocarbon group having 1 to 20 carbon atoms, and "a" is a positive number indicated by $1 \leq a \leq 3$, preferably $0.5 \leq a \leq 2.3$.

Examples of the $R^4$ include alkyl groups, such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, and a hexadecyl group; aryl groups, such as a phenyl group and a naphthyl group; aralkyl groups, such as a benzyl group and a phenethyl group; alkenyl groups, such as a vinyl group and an allyl group; cycloalkyl groups, such as a cyclopentyl group, a cyclohexyl group, and a cycloheptyl group; hydrocarbon groups in which some or all of the hydrogen atoms bonded to the carbon atoms of these functional groups are substituted with atoms such as halogen atoms and/or substituents such as an amino group, an acryloxy group, a methacryloxy group, an epoxy group, a glycidoxy group, a mercapto group, and a carboxy group; and the like.

Note that industrially, 50 mold or more of all the $R^4$ groups are preferably methyl groups.

The organopolysiloxane preferably has a viscosity of 100,000 $mm^2/s$ or less, more preferably 10,000 $mm^2/s$ or less at 25° C. When the viscosity is 100,000 $mm^2/s$ or less, it is possible to obtain polyether-polysiloxane crosslinked rubber spherical particles having a sufficiently narrow particle size distribution by this manufacturing method. Note that the viscosity indicates a value measured by an Ostwald viscometer under 25° C.

[Step (iv)]

Step (iv) is a step of subjecting an organotrialkoxysilane or a tetraalkoxysilane to hydrolysis and polycondensation in the presence of the polyether-polysiloxane crosslinked rubber spherical particle obtained in the step (ii), water, and an alkaline substance to make a polyorganosilsesquioxane or silica adhere to the surface of the rubber spherical particle.

The aqueous dispersion (that is, the dispersion containing the polyether-polysiloxane crosslinked rubber spherical particles and water) obtained in step (ii) may be used in step (iv) as it is, or water may be further added as necessary. 1 to 150 parts by mass of the rubber spherical particles are preferably contained, more preferably 5 to 70 parts by mass based on 100 parts by mass of water. When the amount of the rubber spherical particles relative to the amount of the water is 1 to 150 parts by mass based on 100 parts by mass of water, adhesion of the polyorganosilsesquioxane or silica to the surfaces of the rubber spherical particles can be achieved sufficiently while preventing degradation of the production efficiency of the composite particles, and moreover, aggregation or fusion of the particles can be prevented.

The alkaline substance acts as a catalyst to make the organotrialkoxysilane undergo hydrolysis and condensation reaction. The alkaline substance is not particularly limited, and can be an alkaline substance that makes the hydrolysis and condensation reaction of the organotrialkoxysilane progress. One kind of the alkaline substance may be used, or an appropriate combination of two or more kinds thereof may be used.

The alkaline substance may be added as it is, or may be added as an aqueous alkaline solution.

Examples of the alkaline substance include alkali metal hydroxide, such as potassium hydroxide, sodium hydroxide, and lithium hydroxide; alkaline-earth metal hydroxide, such as calcium hydroxide and barium hydroxide; alkali metal carbonate, such as potassium carbonate and sodium carbonate; ammonia; tetraalkylammonium hydroxide, such as tetramethylammonium hydroxide and tetraethylammonium hydroxide; amines, such as monomethylamine, monoethylamine, monopropylamine, monobutylamine, dimethylamine, diethylamine, trimethylamine, triethanolamine, and ethylenediamine; etc. In particular, ammonia is the most preferable since ammonia can be removed easily from the obtained powder of polyether-polysiloxane crosslinked composite particles by volatilization. Note that as the ammonia, a commercially available aqueous ammonia solution can be used.

The amount of the alkaline substance to be added is preferably an amount at which the pH of the aqueous dispersion of the polyether-polysiloxane crosslinked rubber spherical particles preferably falls within the range of 9.0 to 13.0, more preferably 9.5 to 12.5. When the pH is within the above ranges, the hydrolysis and condensation reaction of the organotrialkoxysilane can be made to progress sufficiently, and a sufficient amount of the obtained polyorganosilsesquioxane or silica can be adhered to the surfaces or the rubber spherical particles.

As a method for adding the alkaline substance, the alkaline substance may be blended in the aqueous dispersion of polyether-polysiloxane crosslinked rubber spherical particles in advance before adding the organotrialkoxysilane, or may be blended after adding the organotrialkoxysilane.

Examples of the organotrialkoxysilane include those shown by $R^4Si(OR^5)_3$. In the formula, $R^4$ represents an unsubstituted or substituted monovalent hydrocarbon group having 1 to 20 carbon atoms, and is as in the description above. $R^5$ represents an unsubstituted monovalent hydrocarbon group having 1 to 6 carbon atoms. Examples of $R^5$ include a methyl group, an ethyl group, a propyl group, a butyl group, a pentyl group, and a hexyl group, and in view of reactivity, a methyl group is preferable.

When at least one of an $R^3{}_2SiO_{2/2}$ unit, an $R^3{}_3SiO_{1/2}$ unit, and an $SiO_{4/2}$ unit is further introduced ($R^3$ is as in the above description regarding polyorganosilsesquioxane) into the polyorganosilsesquioxane, at least one out of $R^4{}_2Si(OR^5)_2$, $R^4{}_3SiOR^5$, and $Si(OR^5)_4$ corresponding to each unit can be added. The $R^4Si(OR^5)_3$ content is preferably 70 to 100 mol %, more preferably 80 to 100 mol % of all the raw materials, for example.

The amount of the organotrialkoxysilane added is preferably an amount at which the amount of the polyorganosilsesquioxane is 1 to 50 parts by mass, more preferably 2 to 25 parts by mass based on 100 parts by mass of the polyether-polysiloxane crosslinked rubber spherical particles.

Examples of the tetraalkoxysilane include those shown by $Si(OR^5)_4$. In the formula, $R^5$ represents an unsubstituted monovalent hydrocarbon group having 1 to 6 carbon atoms, and is as in the above description. $R^5$ is preferably a methyl group or an ethyl group in view of reactivity. That is, tetramethoxysilane or tetraethoxysilane is more preferable. Tetramethoxysilane is the most preferable. Note that as the tetraalkoxysilane, a tetraalkoxysilane in which some or all of the alkoxy groups have been subjected to hydrolysis may be used. Furthermore, a tetraalkoxysilane that has been partially condensed may also be used.

In the step of manufacturing polyether-polysiloxane crosslinked composite particles, a surfactant, a water-soluble polymer compound, or the like may be added to the above-described aqueous dispersion in advance with the object of controlling the adhesive property of the polyorganosilsesquioxane or silica and the size of the obtained composite particles.

A surfactant to be further optionally added to the aqueous dispersion of polyether-polysiloxane crosslinked rubber spherical particles is not particularly limited, and the above-described nonionic surfactants or the like can be used. Note that the surfactant to be added may be the same as or different from the surfactant contained in the aqueous dispersion of rubber spherical particles, and one kind thereof may be used, or an appropriate combination of two or more kinds thereof may be used.

The amount of the surfactant to be added is not particularly limited, but is preferably 0.01 to 20 parts by mass, more preferably 0.05 to 5 parts by mass, based on 100 parts by mass of the aqueous dispersion of polyether-polysiloxane crosslinked rubber spherical particles.

The method for adding the organotrialkoxysilane or tetraalkoxysilane is preferably performed under stirring using ordinary stirrers having propeller blades, planar blades, etc. Stirring is continued from after the addition of the organotrialkoxysilane or tetraalkoxysilane until the hydrolysis and condensation reaction of the alkoxysilane is completed.

When the organotrialkoxysilane or tetraalkoxysilane is to be added after blending the alkaline substance with the aqueous dispersion of polyether-polysiloxane crosslinked rubber spherical particles, the alkoxysilane may be added at once, but is preferably added gradually over time. The temperature of the reaction liquid during the addition is preferably 0 to 40° C., more preferably 0 to 30° C. When the temperature is within the above ranges, the polyorganosilsesquioxane or silica can be well adhered to the surfaces of the rubber spherical particles. In order to complete the hydrolysis and condensation reaction of the alkoxysilane, the reaction can be performed under room temperature or under heating at about 40 to 100° C., and an alkaline substance may also be added appropriately.

The temperature during the condensation reaction is preferably 0 to 60° C., more preferably 0 to 40° C. When the temperature is within the above ranges, the polyorganosilsesquioxane or silica can be well adhered to the surfaces of the polyether-polysiloxane crosslinked rubber spherical particles. Until the polyorganosilsesquioxane or silica is produced, the reaction liquid is preferably left to stand or is placed in a state of very slow stirring. Note that the time to leave the reaction liquid standing is preferably within the range of 10 minutes to 24 hours. After that, in order to complete the condensation reaction, an alkaline substance may be additionally added, or the reaction liquid may be heated under 40 to 100° C.

The water-soluble polymer compound to be optionally added to the aqueous dispersion of polyether-polysiloxane crosslinked rubber spherical particles is not particularly limited, and one kind thereof may be used, or an appropriate combination of two or more kinds thereof may be used. Examples of the water-soluble polymer compound include nonionic water-soluble polymer compounds, anionic water-soluble polymer compounds, cationic water-soluble polymer compounds, zwitterionic water-soluble polymer compounds, and the like.

Examples of the nonionic water-soluble polymer compounds include a copolymer of vinyl alcohol and vinyl acetate, an acrylamide polymer, a vinyl pyrrolidone polymer, a copolymer of vinyl pyrrolidone and vinyl acetate, polyethylene glycol, isopropyl acrylamide polymer, a methyl vinyl ether polymer, starch, methyl cellulose, hydroxyethyl cellulose, hydroxypropyl cellulose, guar gum, xanthan gum, and the like.

Examples of the anionic water-soluble polymer compounds include a sodium acrylate polymer, a copolymer of sodium acrylate and sodium maleate, a copolymer of sodium acrylate and acrylamide, a sodium styrenesulfonate polymer, a copolymer of sodium polyisoprenesulfonate and styrene, a sodium naphthalenesulfonate polymer, carboxymethyl starch, starch phosphate, carboxymethyl cellulose, sodium alginate, arabia gum, carrageenan, chondroitin sulfate sodium, sodium hyaluronate, and the like.

Examples of the cationic water-soluble polymer compounds include a dimethyldiallylammonium chloride polymer, a vinylimidazoline polymer, a methylvinylimidazolium chloride polymer, an ethyltrimethylammonium acrylate chloride polymer, an ethyltrimethylammonium methacrylate chloride polymer, an acrylamidopropyltrimethylammonium chloride polymer, a methacrylamidopropyltrimethylammonium chloride polymer, an epichlorohydrin-dimethylamine copolymer, an ethyleneimine polymer, a quaternized product of an ethyleneimine polymer, an allylamine hydrochloride polymer, polylysine, cationic starch, cationic cellulose, chitosan, derivatives thereof obtained by copolymerizing monomers having a nonionic group or an anionic group to these, and the like.

Examples of the zwitterionic water-soluble polymer compounds include a copolymer of ethyltrimethylammonium acrylate chloride, acrylic acid, and acrylamide, a copolymer of ethyltrimethylammonium methacrylate chloride, acrylic acid, and acrylamide, a Hofmann degradation product of an acrylamide polymer, and the like.

When a water-soluble polymer compound is used, the blended amount thereof is preferably 0.01 to 50 mass %, more preferably 0.1 to 20 mass %, and further preferably 0.3 to 10 mass % of the emulsion obtained by the manufacturing process of the present invention.

[Step of Removing Liquid Impregnating Polyether-Polysiloxane Crosslinked Composite Particle by Volatilization]

Polyether-polysiloxane crosslinked composite particles can be obtained as a powder by making a polyorganosilsesquioxane or silica adhere to the surfaces of the polyether-polysiloxane crosslinked rubber spherical particles, and then removing the liquid and water impregnating the rubber spherical particles by volatilization.

The step of removing the liquid impregnating the polyether-polysiloxane cross linked composite particles by volatilization can follow a conventionally known method. When the impregnating liquid has a high boiling point and cannot be removed by volatilization or when it is desired to remove the liquid by volatilization at a low temperature, cleaning substitution can be performed using a low-boiling-point solvent or the like in a stage before the removal step.

As the solvent used in the cleaning substitution, a conventionally known solvent can be used. Examples thereof include aliphatic hydrocarbons, such as pentane, hexane, heptane, octane, nonane, decane, undecane, dodecane, hexadecane, octadecane, and cyclohexane; aromatic hydrocarbons, such as benzene, toluene, ethylbenzene, and xylene; alcohols, such as butanol, hexanol, cyclohexanol, and benzyl alcohol; halogenated hydrocarbons, such as chloroform, carbon tetrachloride, ethyl chloride, and chlorobenzene; esters, such as ethyl acetate, isopropyl acetate, ethylacetoacetate, and benzyl acetate; ethers, such as ethyl ether, butyl ether, tetrahydrofuran, and 1,4-dioxane; ketones, such as acetone, methyl ethyl ketone, cyclohexanone, methyl amyl ketone, and diisobutyl ketone; and the like.

Examples of the treatment operation in the step of obtaining the particles as a powder include a method of condensing the dispersion beforehand by employing a method such as filtration separation, centrifugation, and decantation. Specifically, for example, the surfactant is added to the dispersion/condensation product and mixed using an ordinary stirrer with propeller blades, planar blades, or the like, and then performing solid-liquid separation by a method such as the filtration separation, centrifugation, and decantation.

The removal by volatilization of the liquid, the solvent substituted by cleaning, or water impregnating the polyether-polysiloxane crosslinked composite particles can be performed by performing a heat treatment under normal pressure or under reduced pressure. Examples include a method of removing the water by leaving the dispersion to stand under heating; a method of removing the liquid while stirring the dispersion under heating to make the dispersion flow; a method of spraying the dispersion in a hot air flow such as a spray dryer; a method of using a flow of hot medium; and the like. Note that a method of condensing the dispersion as a pre-treatment of the operation can also be adopted.

When the powder of the polyether-polysiloxane crosslinked composite particles has aggregated, a method of using a pulverizer such as a jet mill, a ball mill, or a hammer mill for disintegration is possible.

Step (iii) of the inventive method for manufacturing a polyether-polysiloxane crosslinked rubber spherical particle described above can also be performed by such methods, for example.

As one embodiment, the inventive polyether-polysiloxane crosslinked composite particles can be obtained, for example, by a manufacturing method including the following steps.

(I) a step of adding a surfactant and water to a composition containing the component (A) and the component (B) and performing an emulsification treatment to form an emulsion, and then obtaining an aqueous dispersion of polyether-polysiloxane crosslinked rubber spherical particles by an addition-curing reaction between the component (A) and the component (B) in the presence of the component (C); and (II) subjecting an organotrialkoxysilane or a tetraalkoxysilane to hydrolysis and a condensation reaction in the presence of the aqueous dispersion of polyether-polysiloxane crosslinked rubber spherical particles obtained in (I), water, and an alkaline substance to make a polyorganosilsesquioxane or silica adhere to the surfaces of the polyether-polysiloxane crosslinked rubber spherical particles.

As another embodiment, the inventive polyether-polysiloxane crosslinked composite particles can also be obtained, for example, by a manufacturing method including the following steps.

(I') a step of storing a composition containing the components (A), (B), and (D) under a low temperature (20° C. or lower), adding the component (C) thereto, then immediately adding a surfactant and water and performing an emulsification treatment to form an emulsion, and then heating and aging (30° C. or higher) the emulsion to obtain an aqueous dispersion of polyether-polysiloxane crosslinked rubber spherical particles by an addition-curing reaction between the component (A) and the component (B);

(II') subjecting an organotrialkoxysilane or a tetraalkoxysilane to hydrolysis and a condensation reaction in the presence of the aqueous dispersion of polyether-polysiloxane crosslinked rubber spherical particles obtained in (I'), water, and an alkaline substance to make a polyorganosilsesquioxane or silica adhere to the surfaces of the polyether-polysiloxane crosslinked rubber spherical particles.

EXAMPLE

Hereinafter, the present invention will be described specifically with reference to Examples and a Comparative Example, but the present invention is not limited thereto.

Example 1

Preparation of Aqueous Dispersion of Polyether-polysiloxane Crosslinked Rubber Spherical Particles 88.2 g of polypropylene glycol diallyl ether (component (A)) having an average weight molecular weight of 2,000 (manufactured by Sanyo Chemical Industries, Ltd.);

11.8 g of the phenylmethylhydrogenpolysiloxane (component (B)) shown by the following formula (1) (contained in an amount at which there is 1.13 of the hydrosilyl groups of the component (B) relative to 1 of the aliphatic unsaturated groups of the component (A)), (1)

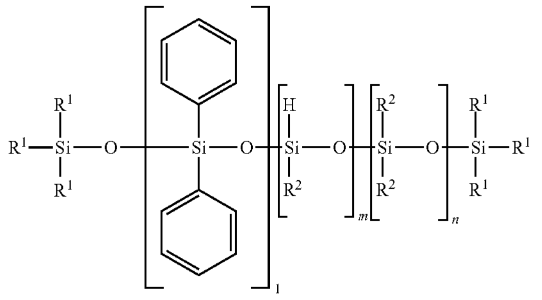

where l=7, m=23, n=0, two of the $R^1$s are hydrogen atoms and the others are methyl groups, and $R^2$ represents a methyl group; and 0.02 g of an antioxidant: dl-α-tocopherol (vitamin EEFC; manufactured by Kunisada Chemical Industrial Co. Ltd.) were charged into a disposable cup having a capacity of 300 ml, and dissolved and dispersed by stirring with a homomixer at 2,000 rpm.

Subsequently, when 0.4 g of polyoxyethylene lauryl ether (ethylene oxide added=23 moles) and 16 g of water were added thereto and stirred using a homomixer at 5,000 rpm, an oil-in-water type emulsion was formed. Thickening was observed, and stirring was continued for a further 10 minutes. When 83.6 g of water was subsequently added while stirring at 1,500 to 2,000 rpm, a uniform white emulsion was obtained. This emulsion was transferred to a glass flask having a stirrer with anchor-type stirring blades and having a capacity of 500 ml, the temperature was adjusted to 20 to 25° C., then a mixed-and-dissolved product of 0.6 g of a solution of a platinum vinyl group-containing disiloxane complex (component (C)) in isododecane (platinum content: 0.5%) and 0.3 g of polyoxyethylene lauryl ether (ethylene oxide added=9 moles) was added under stirring. After stirring at the same temperature for 2 hours, the temperature was again adjusted to 40° C. and the resultant was stirred for 12 hours to obtain a uniform aqueous dispersion of polyether-polysiloxane crosslinked rubber spherical particles.

When the shapes of the polyether-polysiloxane crosslinked rubber spherical particles in the obtained aqueous dispersion were observed with an optical microscope, the particles had spherical forms, and when the volume average particle size was measured using an electric resistance method particle size distribution analyzer "Multisizer 3" (manufactured by BECKMAN COULTER), the result was 3.5 μm.

The hardness of the obtained polyether-polysiloxane crosslinked rubber spherical particles was measured in the following. manner. The above-described polypropylene glycol diallyl ether, the phenylmethylhydrogenpolysiloxane shown by the formula (1), and the solution of the platinum vinyl group-containing disiloxane complex in isododecane (platinum content: 0.5%) were mixed at the blending ratio described above, and poured into an aluminum petri dish so as to achieve a thickness of 10 mm. After leaving the mixture to stand under 25° C. for 24 hours, the mixture was heated in a thermostat at 50° C. for 2 hours to obtain a rubber sample. The obtained rubber was removed from the aluminum petri dish, and the rubber hardness was measured with a Durometer A hardness meter. The result was 30.

Next, the rubber sample prepared in the above manner was stored in a thermo-hygrostat at a temperature of 70° C. and a humidity of 90%, and the change in rubber hardness over time was investigated. Liquefaction (decomposition) was observed on the surface of the sample after one week had passed. That is, it was confirmed that the polyether-polysiloxane crosslinked rubber spherical particles obtained in Example 1 exhibited degradation characteristics induced by external stimuli.

Example 2

88.2 g of the polypropylene glycol diallyl ether (component (A)) shown in Example 1, 11.8 g of the phenylmethylhydrogenpolysiloxane (component (B)) shown in Example 1, and 0.02 g of the antioxidant dl-α-tocopherol were charged into a 300-ml disposable cup, and dissolved and dispersed by stirring with a homomixer at 2,000 rpm. Subsequently, this was stored at a low temperature for a certain period (2 hours or more) under 5 to 10° C., then 0.6 g of a solution of a platinum vinyl group-containing disiloxane complex (component (C)) in isododecane (platinum content: 0.5%) was added quickly, and then stirred at 1,500 rpm to dissolve the solution. Subsequently, when 0.4 g of polyoxyethylene lauryl ether (ethylene oxide added=23 moles) and 16 g of water were added to this dispersion and stirred with a homomixer at 5,000 rpm, an oil-in-water type emulsion was formed. Thickening was observed, and stirring was continued for a further 3 minutes. When 83.6 g of water was subsequently added while stirring at 1,500 to 2,000 rpm, a uniform white emulsion was obtained. This emulsion was transferred to a 500-ml glass flask having a stirrer with anchor-type stirring blades, the temperature was adjusted to 20 to 25° C., and the emulsion was stirred for 2 hours. After that, the temperature was again adjusted to 40° C. and the emulsion was stirred for 12 hours to obtain a uniform aqueous dispersion of polyether-polysiloxane crosslinked rubber spherical particles.

Example 3

86.5 g of the polypropylene glycol diallyl ether (component (A)) shown in Example 1, 13.5 g of the phenylmethylhydrogenpolysiloxane (component (B)) shown in Example 1 (contained in an amount at which there is 1.4 of the hydrosilyl groups of the component (B) relative to 1 of the aliphatic unsaturated groups of the component (A)), and 0.02 g of the antioxidant dl-α-tocopherol were charged into a 300-ml disposable cup and dissolved and dispersed by stirring with a homomixer at 2,000 rpm. As to the subsequent steps; the same preparation steps as in the above-described Example 2 were performed, and as a result, a uniform aqueous dispersion of polyether-polysiloxane crosslinked rubber spherical particles was obtained.

Example 4

A uniform white emulsion was obtained by the same formulation composition and method as shown in Example 2. Then, this emulsion was transferred to a 500-ml glass flask having a stirrer with anchor-type stirring blades, and while performing nitrogen bubbling, the temperature was adjusted to 20 to 25° C. and the emulsion was stirred for 2 hours. After that, the temperature was again adjusted to 40° C. and the emulsion was stirred for 12 hours to obtain a uniform aqueous dispersion of polyether-polysiloxane crosslinked rubber spherical particles.

Example 5

87.7 g of polypropylene glycol diallyl ether (component (A)) having an average weight molecular weight of 2,000 (manufactured by Sanyo Chemical Industries, Ltd.);

12.3 g of the phenylmethylhydrogenpolysiloxane (component (B)) shown by the following formula (1) (contained in an amount at which there is 1.13 of the hydrosilyl groups of the component (B) relative to 1 of the aliphatic unsaturated groups of the component (A)), (1)

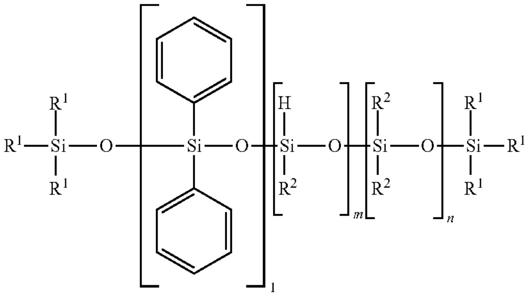

where l=1, m=6, n=1, and $R^1$ and $R^2$ represent methyl groups; and 0.02 g of an antioxidant: dl-α-tocopherol (vitamin EEFC; manufactured by Kunisada Chemical Industrial Co. Ltd.)

were charged into a 300-ml disposable cup and dissolved and dispersed by stirring with a homomixer at 2,000 rpm.

The subsequent preparation steps were performed by the same method as shown in Example 1, and as a result, an aqueous dispersion of polyether-polysiloxane crosslinked rubber spherical particles was obtained.

Example 6

87.7 g of polypropylene glycol diallyl ether (component (A)) having an average weight molecular weight of 2,000 (manufactured by Sanyo Chemical Industries, Ltd.);

12.3 g of the phenylmethylhydrogenpolysiloxane (component (B)) shown by the following formula (1) (contained in an amount at which there is 1.13 of the hydrosilyl groups of the component (B) relative to 1 of the aliphatic unsaturated groups of the component (A)), (1)

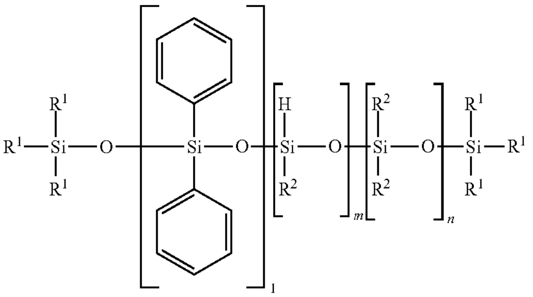

where l=1, m=6, n=1, and $R^1$ and $R^2$ represent methyl groups; and 0.02 g of an antioxidant: dl-α-tocopherol (vitamin EEFC; manufactured by Kunisada Chemical Industrial Co. Ltd.)

were charged into a 300-ml disposable cup and dissolved and dispersed by stirring with a homomixer at 2,000 rpm.

The subsequent preparation steps were performed by the same method as shown in Example 2, and as a result, an aqueous dispersion of polyether-polysiloxane crosslinked rubber spherical particles was obtained.

[Preparation of Polyether-Polysiloxane Crosslinked Rubber Spherical Particles]

Each of the aqueous dispersions of polyether-polysiloxane crosslinked rubber spherical particles obtained in Examples 1 to 6 was dehydrated to have a water content of about 30% by using a pressure filter. The dehydration product was transferred to a 2-L glass flask having a stirrer with anchor-type stirring blades, 1,000 ml of water was added, and stirred for 30 minutes, and then the resultant was dehydrated using a pressure filter.

The dehydration product was transferred again to the 2-L glass flask having the stirrer with anchor-type stirring blades, 1,000 ml of water was added, and stirred for 30 minutes. Then, the resultant was dehydrated using a pressure filter. After that, the aforementioned dehydration product was dried in a reduced-pressure dryer at a degree of vacuum of $3\times10^{-3}$ Pa and a temperature of 100° C. to remove the water.

In this manner, the polyether-polysiloxane crosslinked rubber spherical particles of each of Examples 1 to 6 were obtained in powder form.

Example 7

Preparation of Aqueous Dispersion of Polyether-polysiloxane Crosslinked Rubber Spherical Particles 150.0 g of polypropylene glycol diallyl ether (component (A)) having an average weight molecular weight of 2,000 (manufactured by Sanyo Chemical Industries, Ltd.); 16.23 g of the phenylmethylhydrogenpolysiloxane (component (B)) shown by the following formula (1) (contained in an amount at which there is 1.13 of the hydrosilyl groups of the component (B) relative to 1 of the aliphatic unsaturated groups of the component (A)), (1)

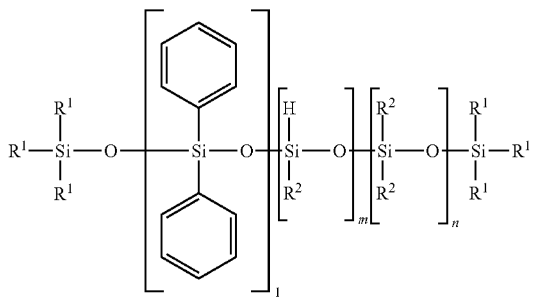

where l=2, m=6, n=0, and $R^1$ and $R^2$ represent methyl groups; and 0.02 g of an antioxidant: dl-α-tocopherol (vitamin EEFC; manufactured by Kunisada Chemical Industrial Co. Ltd.) were charged into a 500-ml disposable cup and dissolved and dispersed by stirring with a homomixer at 2,000 rpm.

Subsequently, when 0.6 g of polyoxyethylene lauryl ether (ethylene oxide added=23 moles) and 39 g of water were added thereto and stirred using a homomixer at 5,000 rpm, an oil-in-water type emulsion was formed. Thickening was observed, and stirring was continued for a further 10 minutes. When 94.2 g of water was subsequently added while stirring at 1,500 to 2,000 rpm, a uniform white emulsion was obtained. This emulsion was transferred to a 500-ml glass flask having a stirrer with anchor-type stirring blades, the temperature was adjusted to 20 to 25° C., then a mixed-and-dissolved product of 0.5 g of a solution of a platinum vinyl group-containing disiloxane complex (component (C)) in isododecane (platinum content: 0.5%) and 0.4 g of polyoxyethylene lauryl ether (ethylene oxide added=9 moles) was added under stirring. After stirring at the same temperature for 2 hours, the temperature was adjusted again to 40-50° C. and the resultant was stirred for 12 hours to obtain a uniform aqueous dispersion of polyether-polysiloxane crosslinked rubber spherical particles.

When the shapes of the polyether-polysiloxane crosslinked rubber spherical particles in the obtained aqueous dispersion were observed with an optical microscope apparatus "ECLIPSE LV100POL" (manufactured by Nikon Corporation), the particles had spherical forms, and when the volume average particle size was measured using an electric resistance method particle size distribution analyzer "Multisizer 3" (manufactured by BECKMAN COULTER), the result was 5.2 μm.

Some of the obtained aqueous dispersion was taken. This was subjected to the same dehydration and water removal as in Example 1 to obtain a powder of the polyether-polysiloxane crosslinked rubber spherical particles. The obtained powder was observed with an electron microscope. The result is shown in FIG. 1.

Preparation of Polyether-polysiloxane Crosslinked Composite Particles 176 g of the aqueous dispersion of polyether-polysiloxane crosslinked rubber spherical particles obtained above was transferred to a 2-L glass flask having a stirrer with anchor-type stirring blades, and 689 g of water, 18.3 g of a 28% ammonia water, and 0.4 g of a 40% aqueous solution of a dimethyldiallylammonium chloride polymer (ME POLYMER H40W; manufactured by TOHO Chemical Industry Co., Ltd.) were added thereto. After adjusting the temperature to 5 to 10° C., 17.2 g of methyltrimethoxysilane (KBM-13; manufactured by Shin-Etsu Chemical Co., Ltd.) was added dropwise over 20 minutes, and while maintaining the temperature of the liquid at this time to 5 to 10° C., the mixture was further stirred for 1 hour. Subsequently, the resultant was heated to 55 to 60° C. and stirred for 1 hour while maintaining the temperature. Thus the hydrolysis and condensation reaction of the methyltrimethoxysilane were allowed to progress sufficiently and were completed.

The obtained aqueous dispersion of polyether-polysiloxane crosslinked composite particles was dehydrated to have a water content of about 30% by using a pressure filter. The dehydration product was transferred to a 2-L glass flask having a stirrer with anchor-type stirring blades, 1,000 ml of water was added, and stirred for 30 minutes, and then the resultant was dehydrated using a pressure filter.

The dehydration product was transferred again to the 2-L glass flask having a stirrer with anchor-type stirring blades, 1,000 ml of water was added, and stirred for 30 minutes. Then, the resultant was dehydrated using a pressure filter. After that, the aforementioned dehydration product was dried in a reduced-pressure dryer at a degree of vacuum of $3\times10^{-3}$ Pa and a temperature of 100° C. to remove the water.

Finally, when the obtained dried product was disintegrated with a jet mill, polyether-polysiloxane crosslinked composite particles having flowability were obtained (FIGS. 2 and 3).

The obtained polyether-polysiloxane crosslinked composite particles were dispersed in water by using a surfactant. As a result, a uniform aqueous dispersion was obtained. That is, it was observed that the polyether-polysiloxane crosslinked composite particles obtained in Example 7 exhibited excellent dispersibility in water.

Next, when the particle size of the polyether-polysiloxane crosslinked composite particles contained in the aqueous dispersion was measured using an electric resistance method particle size distribution analyzer "Multisizer 3" (manufactured by BECKMAN COULTER), the volume average particle size was 6 μm. In addition, when the composite particles were observed with an electron microscope (scanning microscope S-4700; manufactured by Hitachi High-Technologies Corporation), it was observed that on the surfaces of the particles, polymethylsilsesquioxane in the form of particles having a particle size of 100 nm or less had adhered. The adhered amount was 4.1 mass % relative to 100 mass % of the polyether-polysiloxane crosslinked composite particles.

Comparative Example 1

79.0 g of polypropylene glycol diallyl ether (component (A)) having an average weight molecular weight of 2,000 (manufactured by Sanyo Chemical Industries, Ltd.);

21.0 g of the methylhydrogenpolysiloxane (component (X)) shown by the following formula (1) (contained in an amount at which there is 1.13 of the hydrosilyl groups of the component (X) relative to 1 of the aliphatic unsaturated groups of the component (A)), (1)

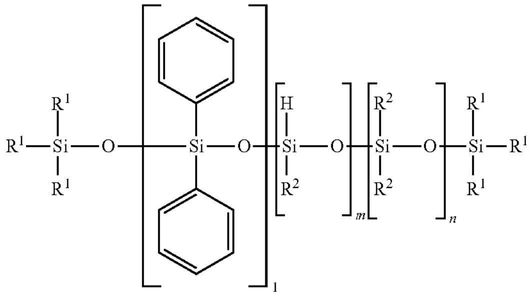

where l=0 (that is, no phenyl groups are contained), m=8, n=24, two of the $R^1$s represent hydrogen atoms and the others represent methyl groups, and $R^2$ represents a methyl group; and 0.02 g of an antioxidant: dl-α-tocopherol (vitamin EEFC; manufactured by Kunisada Chemical Industrial Co. Ltd.) were charged into a 300-ml disposable cup and dissolved and dispersed by stirring with a homomixer at 2,000 rpm.

Subsequently, when 0.4 g of polyoxyethylene lauryl ether (ethylene oxide added=9 moles) and 16 g of water were added thereto and stirred using a homomixer at 5,000 rpm, an oil-in-water type emulsion was formed. Thickening was observed, and stirring was continued for a further 10 minutes. When 83.6 g of water was subsequently added while stirring at 1,500 rpm to 2,000 rpm, a uniform white emulsion was obtained. This emulsion was transferred to a 500-ml glass flask having a stirrer with anchor-type stirring blades, the temperature was adjusted to 20 to 25° C., then a mixed-and-dissolved product of 0.6 g of a solution of a chloroplatinic acid-olefin complex (component (C)) in isododecane (platinum content: 0.5%) and 0.3 g of polyoxyethylene lauryl ether (ethylene oxide added=9 moles) was added under stirring. After stirring at the same temperature for 2 hours, the temperature was adjusted again to 40° C. and the resultant was stirred for 12 hours. As a result, the emulsion disintegrated with the passage of time during stirring, and generation of an aggregate due to curing of a phase-separated oil was observed.

The same dehydration and removal of water as Example 1 were performed on a mixture containing the aggregate obtained in Comparative Example 1 to obtain particles of Comparative Example 1.

[Evaluation of Dispersibility]

The polyether-polysiloxane crosslinked rubber spherical particles of Examples 1 to 6 were respectively dispersed in water by using a surfactant. As a result, a uniform aqueous dispersion was obtained from the polyether-polysiloxane crosslinked rubber spherical particles of each of Examples 1 to 6. That is, it was confirmed that the polyether-polysiloxane crosslinked rubber spherical particles obtained in each of Examples 1 to 6 exhibited excellent dispersibility in water.

Meanwhile, the particles obtained in Comparative Example 1 were dispersed in water by the same procedure. As a result, it was not possible to obtain a uniform aqueous dispersion.

[Evaluation of Degradation Characteristics]

Rubber samples of Examples 2 to 7 were prepared in the same manner as the method for preparing the rubber sample of Example 1, except that the components (A) to (C) used in Examples 2 to 7 were used.

Each of the rubber samples was stored in a thermo-hygrostat at a temperature of 70° C. and a humidity of 90%, and change in rubber hardness over time was investigated. Liquefaction (decomposition) of the surface of each of the samples was observed from after 1 week had passed. That is, it was observed that the crosslinked rubber spherical particles contained in the polyether-polysiloxane crosslinked rubber spherical particles obtained in Examples 2 to 6 and the polyether-polysiloxane crosslinked composite particles obtained in Example 7 exhibited degradation characteristics in response to external stimuli in the same manner as the crosslinked rubber spherical particles of Example 1.

INDUSTRIAL APPLICABILITY

The inventive polyether-polysiloxane crosslinked rubber spherical particles and composite particles have the characteristic structural composition and structure of the particles, and provide dispersibility during blending and during use in an aqueous composition of resins, paints and so on. Therefore, The inventive polyether-polysiloxane crosslinked rubber spherical particles and composite particles are expected to be particularly useful for cosmetics and so forth. Furthermore, the inventive polyether-polysiloxane crosslinked rubber spherical particles and composite particles are also expected to exhibit degradation characteristics in response to external stimulation of the powder.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A polyether-polysiloxane crosslinked rubber spherical particle comprising an addition-reaction product of a composition comprising:

(A) a polyether having at least two aliphatic unsaturated groups in one molecule, the polyether being a polypropylene glycol having the aliphatic unsaturated groups in both terminal moieties in one molecule;

(B) an organohydrogenpolysiloxane shown by the following general formula (1), (1)

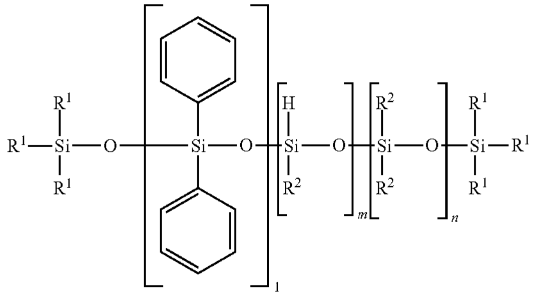

wherein $0<l\leq1000$, $2\leq m\leq1000$, $0\leq n\leq1000$, $R^1$ independently represents a hydrogen atom, a monovalent hydrocarbon group having 1 to 12 carbon atoms that is unsubstituted or is substituted with a halogen atom, or an alkoxy group, and $R^2$ independently represents a monovalent hydrocarbon group having 1 to 20 carbon atoms, the organohydrogenpolysiloxane having at least two silicon-bonded hydrogen atoms in one molecule; and (C) a hydrosilylation-reaction catalyst, and wherein the component (B) is a phenylorganohydrogenpolysiloxane having a value of a solubility parameter Δ of at least 7.5, and satisfying the following inequality (3), the solubility parameter Δ being shown by the following equality (2):

$$\Delta=\rho\Sigma F/M \quad (2)$$

wherein "ρ" is a specific weight of the organohydrogenpolysiloxane, F is a molecular cohesive energy constant $((cal\cdot cm^3)^{1/2}/mol)$ of atoms and functional groups, and M is a molecular weight of the organohydrogenpolysiloxane, $$(l/l+m+n+2)\times 100>10 \quad (3);$$

excluding a combination where two of the aliphatic unsaturated groups are present in the component (A) in one molecule and two of the silicon-bonded hydrogen atoms are present in the component (B) in one molecule.

2. A polyether-polysiloxane crosslinked composite particle comprising:

the polyether-polysiloxane crosslinked rubber spherical particle according to claim 1; and a spherical polyorganosilsesquioxane or silica adhered to a surface of the polyether-polysiloxane crosslinked rubber spherical particle.

3. A method for manufacturing the polyether-polysiloxane crosslinked rubber spherical particle according to claim 1, comprising the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iii) removing water, being an external phase, and water present in the polyether-polysiloxane crosslinked rubber spherical particle from the aqueous dispersion of the polyether-polysiloxane crosslinked rubber spherical particle obtained in the step (ii).

4. A method for manufacturing the polyether-polysiloxane crosslinked composite particle according to claim 2, comprising the steps of:

(i) obtaining an O/W type emulsion including an oil phase component containing the component (A) and the component (B) and an aqueous phase component;

(ii) curing the component (A) and the component (B) contained in the oil phase component in the O/W type emulsion obtained in the step (i) in the presence of the component (C) by an addition-curing reaction to obtain an aqueous dispersion of the polyether-polysiloxane crosslinked rubber spherical particle; and (iv) subjecting an organotrialkoxysilane or a tetraalkoxysilane to hydrolysis and polycondensation in the presence of the polyether-polysiloxane crosslinked rubber spherical particle obtained in the step (ii), water, and an alkaline substance to make a polyorganosilsesquioxane or silica adhere to the surface of the polyether-polysiloxane crosslinked rubber spherical particle.

* * * * *